United States Patent
Paasch et al.

(10) Patent No.: US 10,315,472 B2
(45) Date of Patent: Jun. 11, 2019

(54) CURRENCY OPERATED AUTOMOBILE FLUID DISPENSING AND/OR RECOVERY ASSEMBLIES AND METHODS

(71) Applicants: Robert W. Paasch, Wilder, ID (US); Ray Gross, Wilder, ID (US)

(72) Inventors: Robert W. Paasch, Wilder, ID (US); Ray Gross, Wilder, ID (US)

(73) Assignee: Consumer Products International LLC., Wilder, ID (US)

( * ) Notice: Subject to any disclaimer, the term of this patent is extended or adjusted under 35 U.S.C. 154(b) by 164 days.

(21) Appl. No.: 15/302,159

(22) PCT Filed: Apr. 7, 2015

(86) PCT No.: PCT/US2015/024750
§ 371 (c)(1),
(2) Date: Oct. 5, 2016

(87) PCT Pub. No.: WO2015/157311
PCT Pub. Date: Oct. 15, 2015

(65) Prior Publication Data
US 2017/0021683 A1     Jan. 26, 2017

Related U.S. Application Data

(60) Provisional application No. 61/976,812, filed on Apr. 8, 2014.

(51) Int. Cl.
*B60C 25/00*     (2006.01)
*B29C 73/16*     (2006.01)
(Continued)

(52) U.S. Cl.
CPC .......... *B60C 25/16* (2013.01); *B29C 73/166* (2013.01); *B60S 5/04* (2013.01); *B29L 2030/00* (2013.01)

(58) Field of Classification Search
CPC ..... B29C 73/166; B29C 73/025; B29C 73/02; B60S 5/04; B60C 25/16
See application file for complete search history.

(56) References Cited

U.S. PATENT DOCUMENTS

| | | | |
|---|---|---|---|
| 4,115,172 | A | 9/1978 | Baboff et al. |
| 4,765,367 | A | 8/1988 | Scott |

(Continued)

FOREIGN PATENT DOCUMENTS

| | | |
|---|---|---|
| CN | 102062219 | 5/2011 |
| CN | 2015800249089 | 10/2017 |

(Continued)

OTHER PUBLICATIONS

WO PCT/US2015/024750 IPRP, Oct. 12, 2016, Robert W. Paasch et al.

(Continued)

*Primary Examiner* — Timothy L Maust
*Assistant Examiner* — Timothy P. Kelly
(74) *Attorney, Agent, or Firm* — Wells St. John P.S.

(57) ABSTRACT

The present disclosure provides tire repair assemblies, methods for repairing tires, standalone currency operated tire repair assemblies, tire sealant vending assemblies configured to provide tire sealant via the valve stem of a tire, tire valve coupling assemblies that are configured to provide gas and/or sealant to a tire, tire valve coupling assemblies, and/or methods for providing one or both of gas and/or tire sealant to a tire are provided.

3 Claims, 18 Drawing Sheets

(51) Int. Cl.
*B60S 5/04* (2006.01)
*B29L 30/00* (2006.01)

(56) References Cited

U.S. PATENT DOCUMENTS

| | | | |
|---|---|---|---|
| 5,562,773 | A | 10/1996 | Church |
| 6,283,172 | B1 | 9/2001 | Thurner |
| 7,287,565 | B2 | 10/2007 | Hottebart et al. |
| 8,640,744 | B2 | 2/2014 | Dowel |
| 9,073,269 | B2 | 7/2015 | Zalzalah |
| 9,259,982 | B2 | 2/2016 | Paasch |
| 9,840,046 | B2 | 12/2017 | Eckhardt |
| 2005/0045259 | A1 | 3/2005 | Hottebart et al. |
| 2009/0301602 | A1 | 12/2009 | Lolli et al. |
| 2010/0101375 | A1* | 4/2010 | Yoshida ............... B29C 73/166 81/15.6 |
| 2011/0155280 | A1 | 6/2011 | Eckhardt |
| 2011/0290372 | A1 | 12/2011 | Dowel |
| 2013/0014858 | A1 | 1/2013 | Zalzalah |
| 2013/0048146 | A1 | 2/2013 | Eckhardt |
| 2013/0105055 | A1 | 5/2013 | Chou |
| 2017/0313003 | A1 | 11/2017 | Eckhardt |

FOREIGN PATENT DOCUMENTS

| | | |
|---|---|---|
| EP | 0938408 B1 | 4/2003 |
| FR | 2753653 | 3/1998 |
| JP | 2004-338158 | 2/2004 |
| JP | 2005-004433 | 1/2005 |
| JP | 2005-526649 | 8/2005 |
| JP | 2007-083688 | 4/2007 |
| JP | 2010-036509 | 2/2010 |
| KR | 10-2013-0004919 | 1/2013 |
| WO | WO 2013/009939 | 1/2013 |
| WO | WO PCT/US2015/024750 | 10/2016 |

OTHER PUBLICATIONS

WO PCT/US2015/024750 Search Rept., Jul. 28, 2015, Robert W. Paasch et al.
WO PCT/US2015/024750 Writ. Opin., Jul. 28, 2015, Robert W. Paasch et al.
EP 15776591.8 Partial Supp SR, Nov. 2, 2017, Paasch et al.
WO PCT/US2017/047003 Search Rept., Oct. 23, 2017, Paasch et al.
WO PCT/US2017/047003 Writ. Opin., Oct. 23, 2017, Paasch et al.
EP 15776591.8 Supp. SR, Feb. 21, 2018, Paasch et al.

* cited by examiner

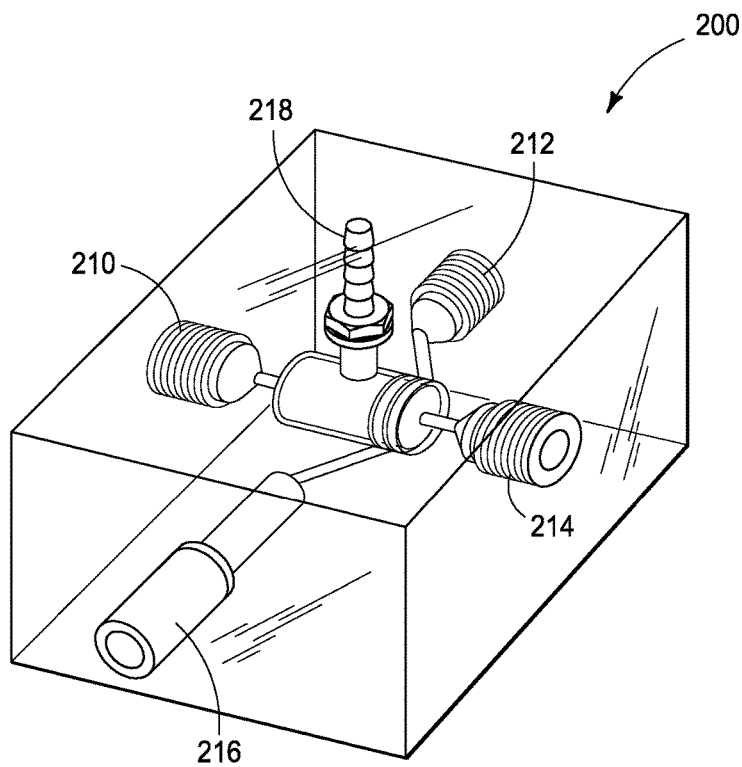
FIG. 9
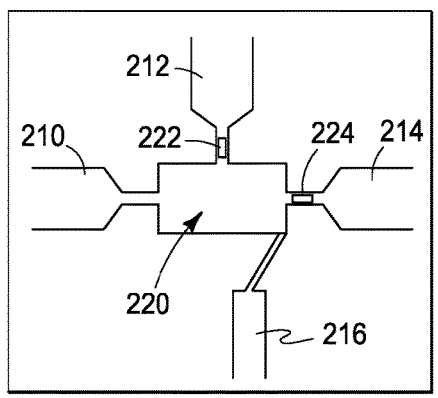 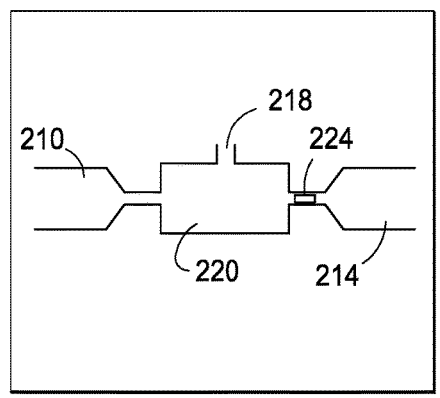
FIG. 10  FIG. 11

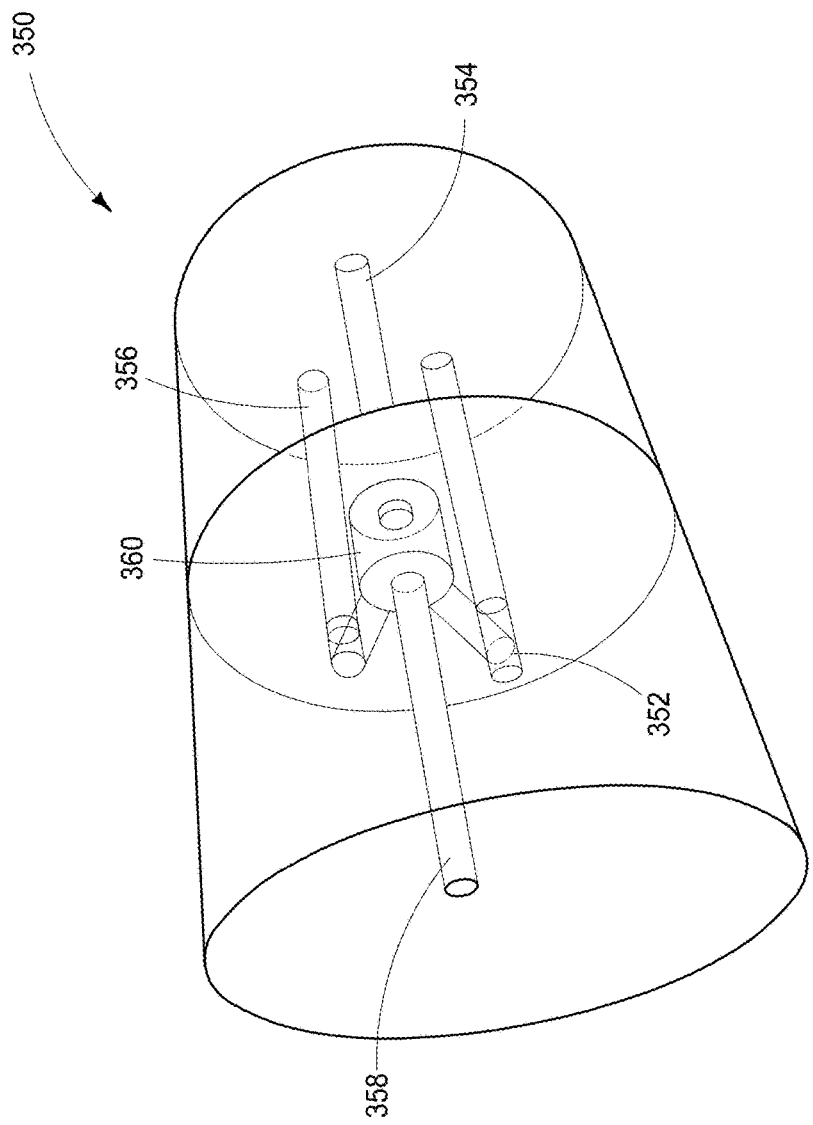

CURRENCY OPERATED AUTOMOBILE FLUID DISPENSING AND/OR RECOVERY ASSEMBLIES AND METHODS

RELATED PATENT DATA

This application is a 35 U.S.C. § 371 of and claims priority to PCT International Application Number PCT/US2015/024750, which was filed 7 Apr. 2015 (7 Apr. 2015), and was published in English, which claims priority under 35 U.S.C. § 119 to U.S. Provisional Patent Application No. 61/976,812 which was filed 8 Apr. 2014 (8 Apr. 2014), the entirety of each of which are incorporated herein by reference.

TECHNICAL FIELD

The present disclosure relates to tire inflation repair assemblies and methods, and in particular embodiments, currency operated fluid addition and tire repair assemblies and methods.

BACKGROUND

Fluids that may be added to tires to repair leaks in tires are currently available. The present disclosure addresses the problem of providing these fluids at remote locations at a cost to the consumer, thereby alleviating the need for the consumer to store these fluids in a vehicle. The storage of these fluids can be difficult because the consumer is required to periodically exchange the fluids for other fluids that may be newer or fresher fluids. The present disclosure provides currency operated assemblies and methods for providing these fluids. The preparation of these assemblies and methods can be difficult for at least the reason that the fluids have a tendency to clog conduits that they may in for extended periods of time. Embodiments of the present disclosure provide methods and assemblies that overcome these problems.

SUMMARY

The present disclosure provides tire repair assemblies that can include: a tire sealant tank; an air assembly coupled to the tire sealant tank; a valve configured to control fluid communication between the tank and the air assembly; and a currency operating assembly configured to control the valve.

Methods for repairing tires are also provided with the methods including providing tire sealant to a tire from a tire repair assembly upon depositing currency in the tire repair assembly.

Standalone currency operated tire repair assemblies are also provided with the assemblies including: a tire sealant tank; an air compressor operatively coupled to the tank; a valve operatively aligned between the tank and the air compressor; a flow meter operatively aligned between the tank and the air compressor; and computer processing circuitry operatively coupled to the air compressor, the valve, and the flow meter.

Tire sealant vending assemblies configured to provide tire sealant via the valve stem of a tire are also provided, the assemblies can include: a gas supply assembly; a sealant supply assembly; a manifold in fluid communication with the gas supply and sealant supply assemblies, the manifold defining at least one junction of at least two conduits in fluid communication, a first of the two conduits in fluid communication with the gas supply assembly and a second of the two conduits in fluid communication with the sealant supply, wherein a valve resides within the second conduit of the manifold between the one junction and the sealant supply; and a tire valve stem coupling device in fluid communication with the manifold.

Tire sealant vending assemblies configured to provide tire sealant via the valve stem of a tire are also provided, the assemblies can include: a gas supply assembly; a sealant supply assembly; and a bundle of conduit extending from the supply assemblies to a tire valve stem coupling device, individual conduits within the bundle respectively being in fluid communication with the assemblies.

Tire valve coupling assemblies that are configured to provide gas and/or sealant to a tire are provided. The assemblies can include an actuator to configure the device to discharge gas in one configuration and tire sealant in another configuration.

Tire valve coupling assemblies are provided that can include: a nozzle extending longitudinally from one end to another end, the one end defining a plurality of openings extending as a plurality of conduits into the nozzle, and the other end defining a single opening extending as a single discharge conduit into the nozzle, the nozzle further defining a junction of the plurality of conduits and the discharge conduit; and a chuck configured to operatively engage the one end of the nozzle in two configurations, one of the two configurations locking the nozzle within the chuck and the other of the two configurations unlocking the nozzle within the chuck, the chuck defining a plurality of recesses that are complimentary to the plurality of openings of the one end of the nozzle.

Methods for providing one or both of gas and/or tire sealant to a tire are provided. The methods can include: providing a tire valve stem coupling device; providing sealant through the device to a valve stem of a tire and into the tire; and without providing sealant through the device, providing gas through the device to the valve stem of the tire and into the tire.

Methods for providing one or both of gas and/or tire sealant to a tire are provided. The methods can include: providing both gas and tire sealant to a manifold operatively coupled to both a gas supply assembly and a tire sealant supply assembly; providing at least one valve within the manifold; engaging the one valve to discharge only gas from the manifold to the tire; and disengaging the one valve within the manifold to discharge tire sealant from the manifold to the tire.

Methods for providing one or both of gas and/or tire sealant to a tire are provided. The methods can include providing both gas and tire sealant through a bundle of conduit to a tire valve stem coupling device and operatively configuring the device in a first configuration to provide only gas to the tire or in a second configuration to provide tire sealant to the tire.

BRIEF DESCRIPTION OF THE DRAWINGS

Embodiments of the disclosure are described below with reference to the following accompanying drawings.

FIG. 9 is a subassembly of an assembly according to another embodiment of the disclosure.

FIG. 10 is an overview cross section of the subassembly of FIG. 9.

FIG. 11 is an elevational cross section of the subassembly of FIG. 9.

FIG. 17 is a more detailed view of a portion of the valve stem coupling device according to an embodiment of the disclosure.

DESCRIPTION

Figure 1:
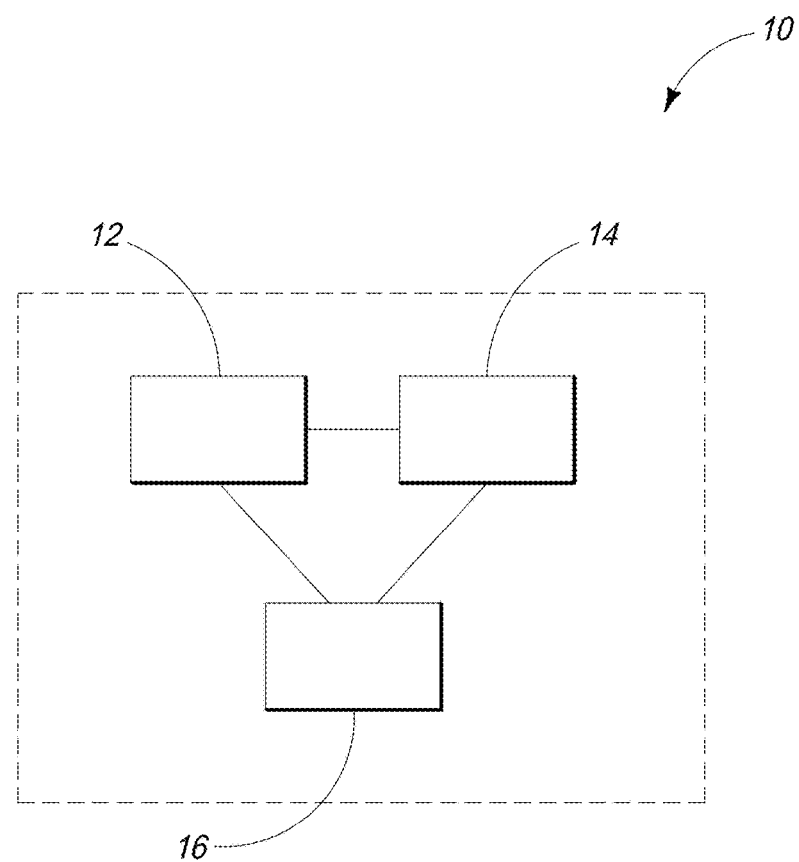
FIG. 1 is an assembly according to an embodiment of the disclosure.

The assemblies and methods of the present disclosure will be described with reference to FIGS. 1-23. Referring first to FIG. 1, an assembly 10 is shown that includes an air consolidation assembly 12. Air consolidation assembly 12 can be a motorized compressor, for example. It can also be a pressurized tank of air. The air that may be utilized may be pure oxygen, or air itself which is a mixture of oxygen, nitrogen, and carbon dioxide, for example. It may also be nitrogen, for example. This air supply 12 may be coupled to a valve assembly 16. Valve assembly 16 may be a solenoid valve that can be operated through mechanical and/or electrical means, for example. In accordance with example configurations, a mechanically operated solenoid valve may provide air from assembly 12 to fluid storage assembly 14. Fluid storage assembly 14 may be a tank or other container that may be constructed of, for example, metal or an inert plastic such as a polypropylene or polystyrene material. Fluid container 14 can contain a tire sealant, for example. The fluid can be, for example, liquid latex based, liquid rubber based, synthetic foaming agents and of varying viscous coagulating properties to seal punctures. Control of value 16 thereby providing air from assembly 12 through liquid container 14 can be manipulated through a user interface. The user interface may be mechanical and/or electrical. The user interface may be computer operated, for example, as well. The user interface may be configured to receive coins for operation or other currency, such as dollar bills. The user interface may also be configured to receive credit cards for operation as well. Upon initiation of the valve solenoid, air can be provided from air storage assembly 12 to fluid container 14, and fluid and air can be provided to a tire for re-inflation and/or repair, as desired. The tubing connecting air assembly 12 and the fluid assembly 14 as well as the tubing to the tire can be constructed of an inert material that does not facilitate the solidification of the sealant material in tank 14. In accordance with example configurations, the sequence of events can be started to facilitate the repair and/or filling of a tire. For example, upon initiation of operation of assembly 10, a slight amount of air can be added to the tire, and then the solenoid engaged to provide tire sealant to the tire, and then a desired amount of tire sealant or a predetermined amount of tire sealant is added followed by air being provided through the lines to the tire. In such a fashion, the lines exiting the assembly can be cleared of sealant for the next use.

Figure 2:
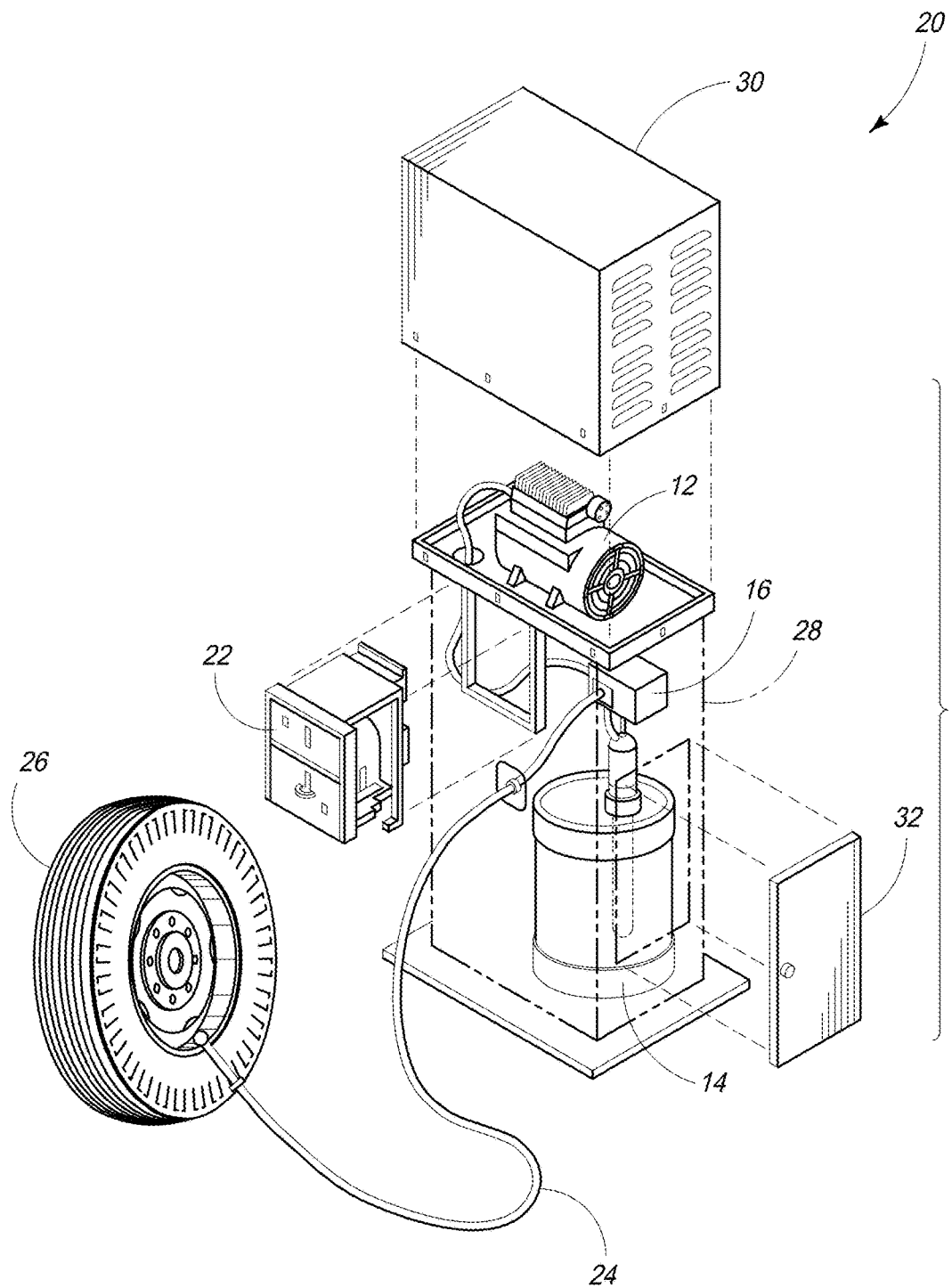
FIG. 2 is an assembly according to another embodiment of the disclosure.

Referring to FIG. 2, an assembly 20 is provided according to another embodiment. In accordance with example configurations, assembly 20 includes air assembly 12 which, as shown here, is an air compressor. Assembly 20 can include valve assembly 16 as well as tank assembly 14. Assembly 20 can also include interface 22. As shown here, interface 22 can be a coin operated interface. Assembly 20 can include a top cover 30 as well as a door panel 32 that may be connected to a housing 28 that encompasses a substantial number of assemblies within assembly 20. Assembly 20 can also include line 24 such as a tire hose that may be utilized to extend to a tire 26 for inflation.

As can be seen from assembly 20, repair maintenance access can be provided to different components of assembly 20 by design. For example, cover 30 can be removed from assembly 20 to allow access to air assembly 12 for repair and maintenance. Also, door 32 can be coupled to housing 28 to allow for repair and maintenance and/or refilling of tank 14. According to example implementations, tank 14 can be a refillable tank that may not have hard side walls. It may be simply a bag with soft side walls that may be suspended in a tank. These tanks can have easy-clasp configurations or snap fits that allow for the quick release of the tank to the hardware of assembly 12. In accordance with example implementations, upon initiation of the repair and filling sequence, compressor 12 may be initiated for a few moments to build up sufficient pressure and air provided to tire 26, then at a predetermined time or desired time, valve 16 may be engaged to provide fluid from tank 14 through tubing 24 to tire 26. Upon a desired amount of time and/or an amount of fluid being provided to tire 26, a close down or cleaning sequence may be initiated, allowing for the removal of fluid from lines such as tire line 24.

Figure 3:
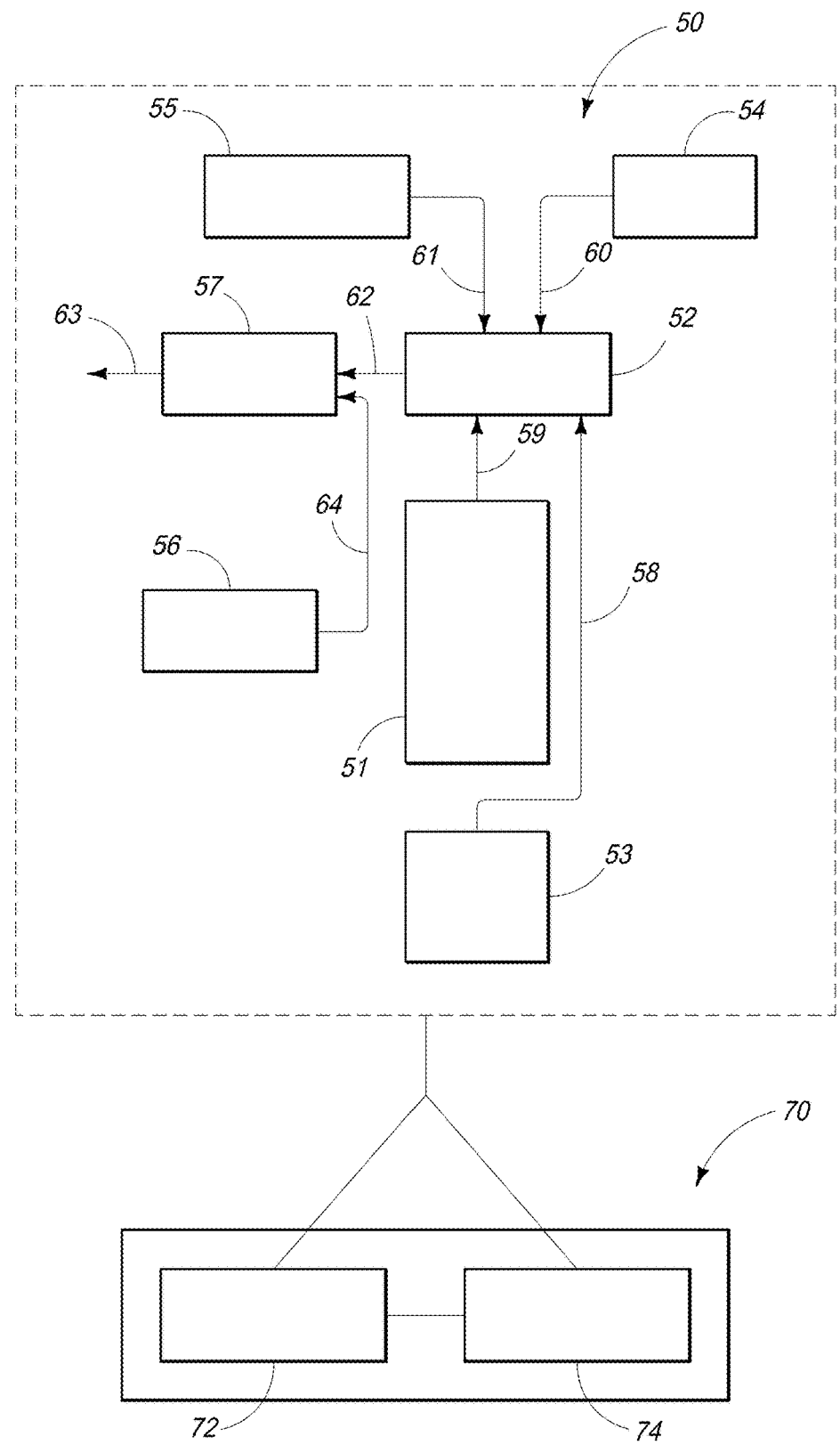
FIG. 3 is an operational schematic for use with embodiments of the assemblies of the disclosure.

Referring to FIG. 3, tire repair assembly 50 can include a tire sealant tank 51. Tank 51 can be configured as a product storage tank and may include a proprietary filling unit that only accepts manufacture/operator designed interfaces to discourage other non-approved sealants from being utilized. Tank 51 can contain a suspension of flakes and fine fibers in a liquid, and/or a natural or synthetic liquid rubber; example materials include latex materials.

Air assembly 52 such as a pressure unit that can include an air compressor such as diaphragm pump, piston or screw pump and/or air pressure pump can be coupled to the tire sealant tank 51 via pressure unit product connection 59. Connections such as connection 59 can be used to operatively couple components of assembly 52. In this case the operatively coupling is fluid communication. In accordance with example implementations fluid communication between these components as well as all components in the assembly can be controlled by one or a combination of valves and/or flow meters.

As indicated herein assembly 50 can include a currency operating assembly. This operating assembly may be mechanically and/or electronically coupled to the one or more valves and/or flow meters operatively aligned along the fluid communication between components. In one example, the mechanical coupling can engage/disengage the valves and/or flow meters.

In accordance with another implementation, assembly 50 can include computer processing circuitry 70. Circuitry 70 can be configured/used to control valves and/or flow meters of assembly 50 as well as record/control other components of assembly 50. Circuitry 70 can include processing circuitry 72 as well as storage circuitry 74. Circuitry 70 may have a user interface in the form of a wired or wireless interface for example. Example processing circuitry can include but is not limited to communications circuitry such as wireless communication devices, for example WiFi devices. Example communications circuitry can be a mini computer equipped with a WiFi connection.

Processing circuitry can include circuitry configured to implement desired programming provided by appropriate media in at least one embodiment. For example, processing circuitry may be implemented as one or more of a processor and/or other structure configured to execute executable instructions including, for example, software and/or firmware instructions, and/or hardware circuitry. Exemplary embodiments of processing circuitry include hardware logic, PGA, FPGA, ASIC, state machines, and/or other structures alone or in combination with a processor. These examples of processing circuitry are for illustration and other configurations are possible.

At least some embodiments or aspects described herein may be implemented using programming stored within appropriate processor-usable media and/or communicated via a network or other transmission media and configured to control appropriate processing circuitry. For example, programming may be provided via appropriate media including, for example, embodied within articles of manufacture, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure or medium. Example programming including processor-usable code may be communicated as a data signal embodied in a carrier wave in but one example.

Storage circuitry may be embodied in a number of different ways using electronic, magnetic, optical, electromagnetic, or other techniques for storing information. Some specific examples of storage circuitry include, but are not limited to, a portable magnetic computer diskette, such as a floppy diskette, zip disk, hard drive, random access memory, read only memory, flash memory, cache memory, and/or other configurations capable of storing programming, data, or other digital information. In one embodiment, storage circuitry may store programming implemented by the processing circuitry.

The user interface is configured to interact with a user including conveying data to a user (e.g., displaying data for observation by the user, audibly communicating data to a user, etc.) as well as receiving inputs from the user (e.g., tactile input, voice instruction, etc.). Accordingly, in one example embodiment, the user interface may include a display (e.g., cathode ray tube, LCD, etc.) configured to depict visual information and an audio system as well as a keyboard, mouse and/or other input device. This interface may be integrated with the currency assembly, for example. Any other suitable apparatus for interacting with a user may also be utilized.

The circuitry can be operatively coupled to one or more of the air assembly, the sealant tank, the currency operating assembly, and/or the valve. Via the interface, information such as one or more of sealant amount, currency received, and/or credit card information can be provided to remote computers.

Assembly 50 can also include a clean out assembly 56 associated with the air assembly and the tire sealant container. Accordingly, pressure unit clean out assembly 56 can be coupled via pressure unit clean out connection 64 to flow meter 57 which can be operatively coupled to air assembly 52.

Assembly 50 can also include a temperature control assembly, such as temperature control 55, operatively coupled to the tire sealant tank 51 and/or conduits associated with same, temperature control of assembly 50 thereby providing heat at night and/or cooling during the day.

Flow meters such as flow meter 57 can be operatively coupled to the outlet of the tire sealant tank as well as assemblies 52 and 56.

Assembly 50 can also include a scale 53 that may be operatively engaged with tank 51 to acquire data relating to amount of sealant used/available. This data may be acquired/processed with circuitry 70. Scale 53 can include a volume sensor, and/or sealant levels may be monitored by weight float system, visual window, for example. Time flow controller 54 may be utilized to regulate flow of sealant.

Connections 58, 60, 61, 62, and/or 63 can be utilized to operatively connect the assemblies. The operative connection can include fluid conduit and electrical conduit as appropriate.

Assemblies of the present disclosure may be provided as a standalone unit, requiring only a power supply to operate, or components of the assemblies can be provided to already existing units and the existing units reconfigured.

In accordance with the assemblies provided, methods for repairing tires can include providing tire sealant to a tire from a tire repair assembly upon depositing currency in the tire repair assembly. In accordance with an example aspect, after providing the sealant, flushing any remaining sealant from any conduits used to provide the sealant can be performed.

The tire sealant can be maintained in a fluid state by controlling the temperature, for example, and this control may be performed according to a predetermined plan or as instructed remotely, for example. As another example of remote control, upon the providing sealant, processing circuitry can signal a remote computer processing system as to the status of the tire repair assembly. This can also be performed periodically and data can be exchanged between two systems; such data can include tire sealant amount available/used and/or currency received.

Figure 4:
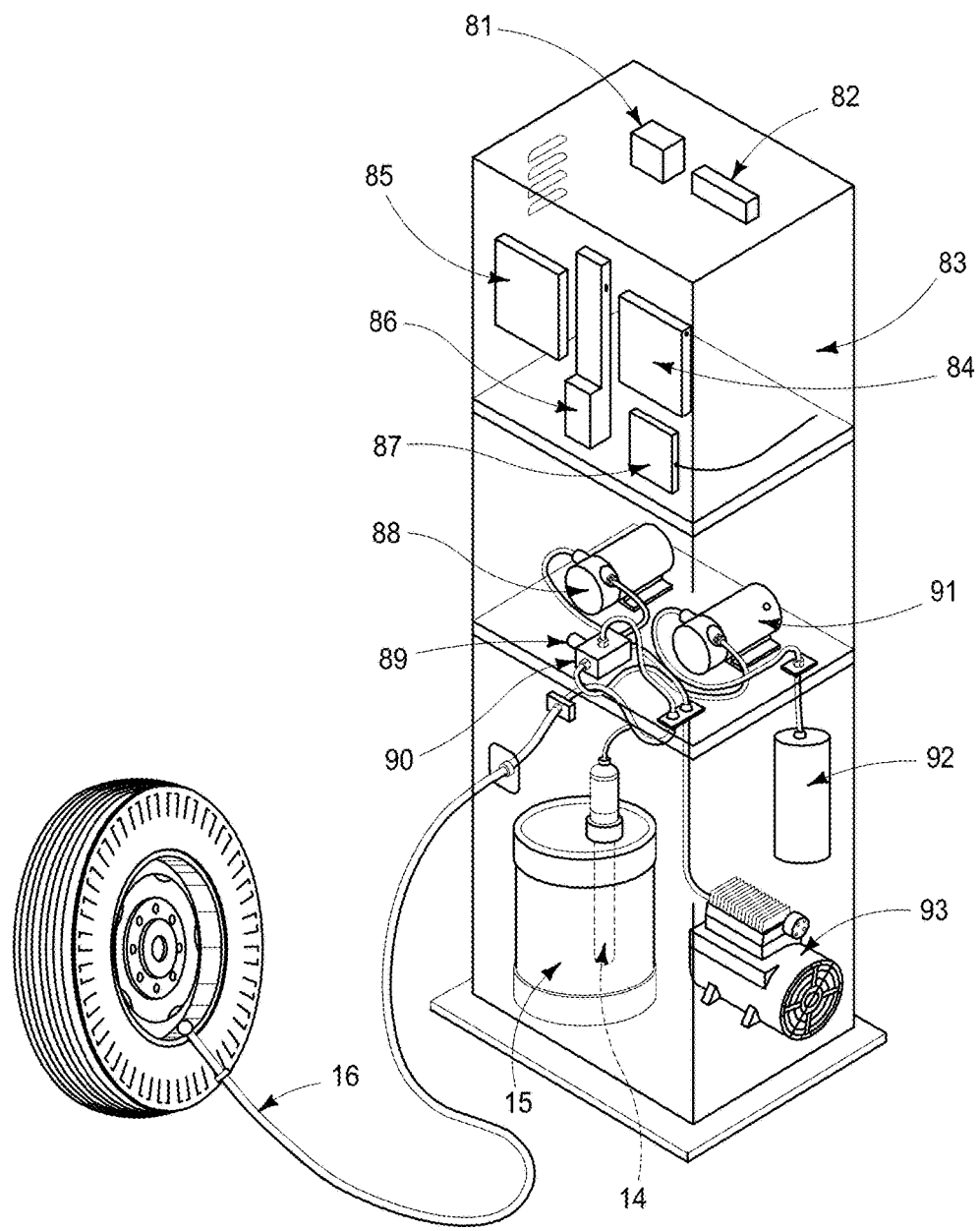
FIG. 4 is an assembly according to another embodiment of the disclosure.

Referring next to FIG. 4, an assembly according to another embodiment of the disclosure is provided. This assembly includes master control module 81 coupled to control module 82 both of which are coupled via a wire harness 83 to customer selection module 84, credit card module 85, dollar verifier 86, automated voice module 87, sealant pump 88, air pressure sensor 89, hose evacuation pump 91, and air pump 93. Pumps 88 and 91 are coupled via mixer control valve 90 and can be coupled to clean out tank 92.

Figure 5:
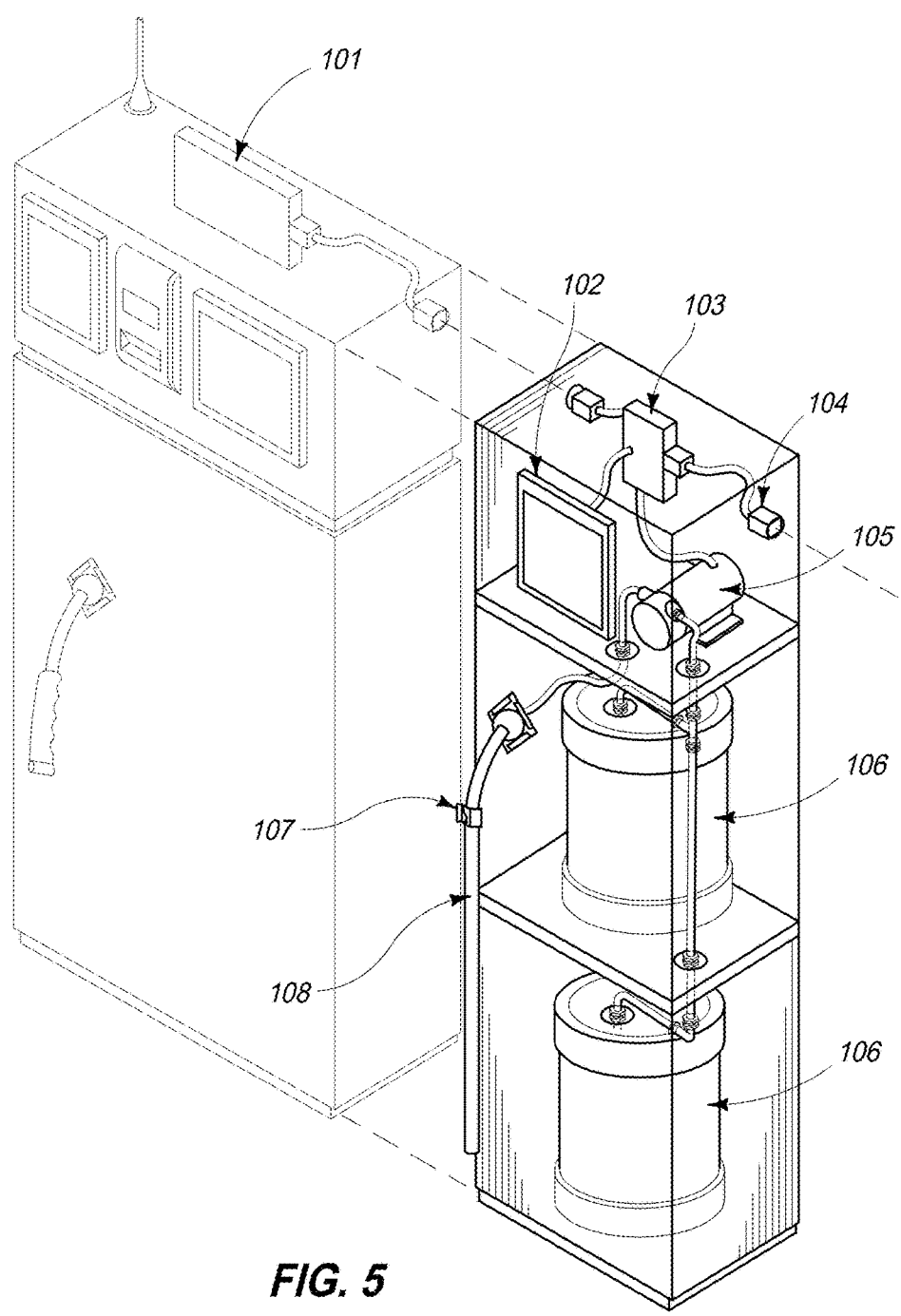
FIG. 5 is an assembly according to another embodiment of the disclosure.

Referring next to the assembly depicted in FIG. 5, an oil collection assembly can be provided that includes a master control module 101, which can be the control module of a tire pressurization and repair assembly described. Module 101 can be coupled to expansion control module 103 which can be coupled to an expansion cable 104 as well as vacuum pump 105 and product selection panel 102. Pump 105 can be coupled to used oil container 106 and oil collection tube 108 having shut off valve 107.

Figure 6:
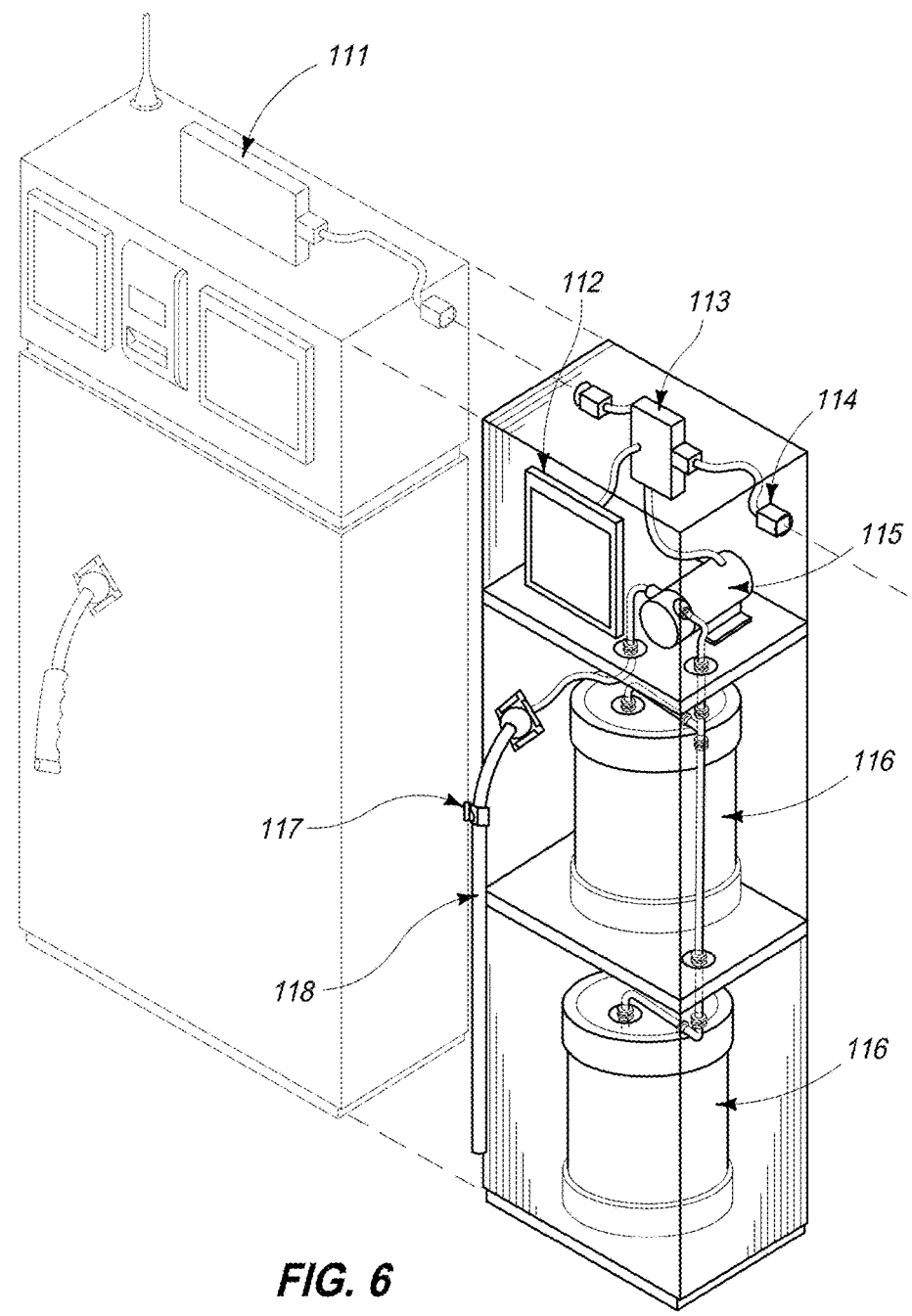
FIG. 6 is an assembly according to another embodiment of the disclosure.

Referring next to the assembly depicted in FIG. 6, an antifreeze disposal unit is shown that includes a master control module 111, which can be the control module of a tire pressurization and repair assembly described. Module 111 can be coupled to expansion control module 113 which can be coupled to an expansion cable 114 as well as vacuum pump 115 and product selection panel 112. Pump 115 can be coupled antifreeze container 116 and antifreeze collection tube 118 having shut off valve 117.

Figure 7:
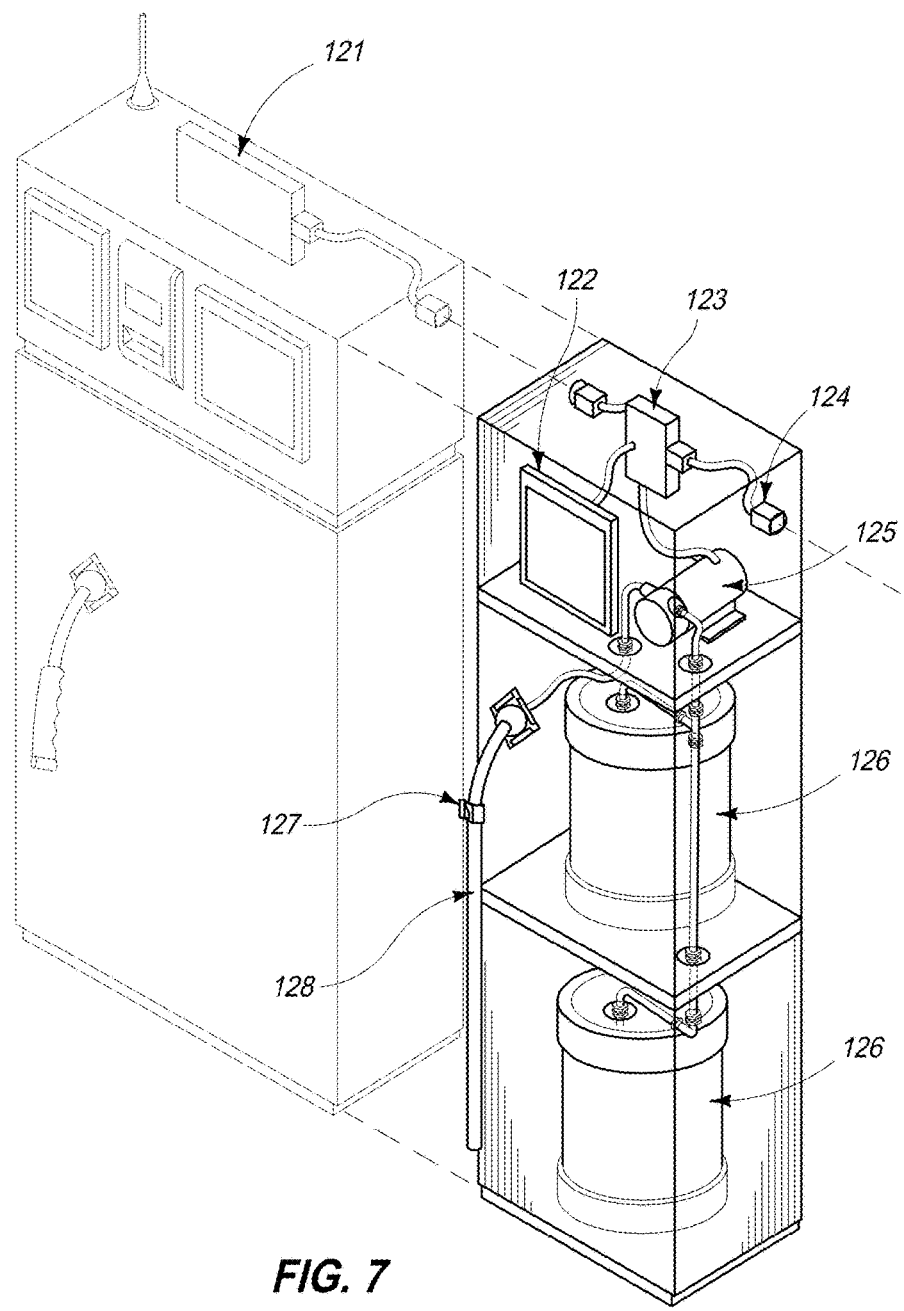
FIG. 7 is an assembly according to another embodiment of the disclosure.

Referring next to the assembly depicted in FIG. 7, a wiper fluid dispenser unit is shown that includes a master control module 121, which can be the control module of a tire pressurization and repair assembly described. Module 121 can be coupled to expansion control module 123 which can be coupled to an expansion cable 124 as well as vacuum pump 125 and product selection panel 122. Pump 125 can be coupled to wiper fluid container 126 and fluid filler tube 128 having shut off valve 127.

Figure 8:
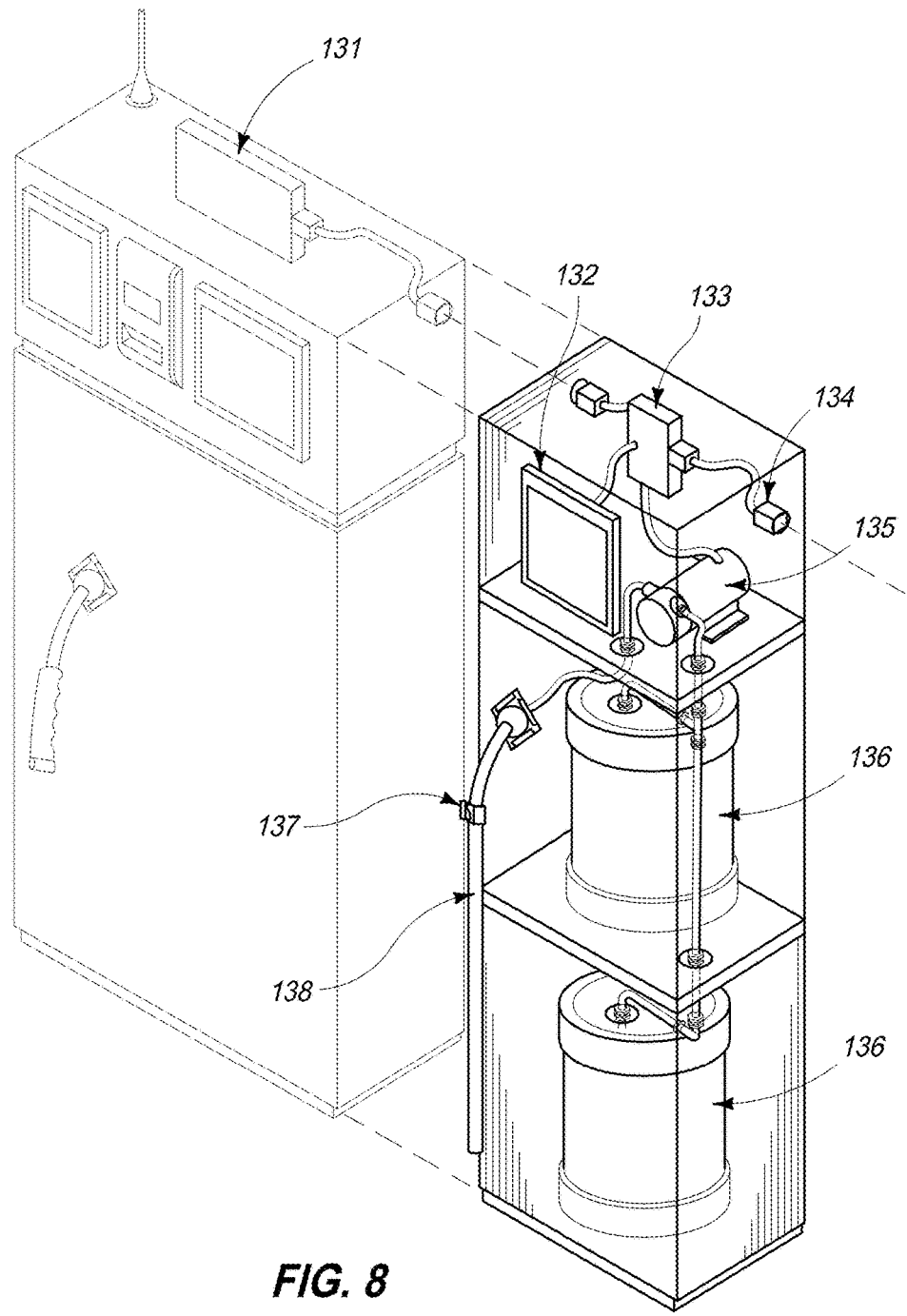
FIG. 8 is an assembly according to another embodiment of the disclosure.

Referring next to the assembly depicted in FIG. 8, an oil dispenser unit is shown that includes a master control module 131, which can be the control module of a tire pressurization and repair assembly described. Module 131 can be coupled to expansion control module 133 which can be coupled to an expansion cable 134 as well as vacuum pump 135 and product selection panel 132. Pump 135 can be coupled to oil container 136 and oil filler tube 138 having shut off valve 137.

Referring next to FIG. 9, a subassembly of one or more assemblies of the present disclosure is depicted. In accordance with example embodiments the subassembly can be a manifold that completes the coupling of conduits of the assemblies of the present disclosure. For example, conduits conveying sealant, conveying air, conveying sealant and/or air as well as a conduit to receive conduit clean out can be coupled to the manifold. As shown the manifold can be coupled to a pressure gauge, the gauge having a range between 10 and 170 psi. Reading this gage can initiate flow from one or more conduits to the manifold. Within the manifold is a recess that has linear alignment with the sealant, cleanout, and/or sealant and/or air to tire conduit, but angled alignment with the conduit to the pressure gauge and/or air intake. The manifold can be a portion of or work in conjunction with assemblies 16, 20, mixer control valve 90, and/or device 254 for example.

Example manifold 200 of FIG. 9 can include at least three entry ports. The entry ports can be utilized for one or more of a gas such as refilling air or nitrogen or other gaseous elements that can be provided to an inflatable apparatus; for sealant and/or for a cleanout solution. As can be seen, two of these three receptacles can include valves, and these valves can be manipulated to change the configuration of the manifold, allowing for desired discharge from the manifold.

In accordance with example configurations, receptacle 210 can be configured to receive gas from a gas supply system via conduit, for example, and this gas can be provided to an opening or void within the manifold that is shown in the cross section provided in FIG. 10. As can be seen, the gas can be provided directly to void 220, and void 220 can be an expansion within manifold 200, for example.

In accordance with example implementations, receptacle 212 can be configured to receive tire sealant from a tire sealant supply system or assembly, and tire sealant receptacle 212 can have a valve 222 associated therewith. Valve 222 can be operably configured to open and/or close the fluid communication between receptacle 212 and void 220.

In accordance with example implementations, another receptacle 214 can be configured to receive clean out fluid from a clean out fluid supply assembly, and this receptacle 214 can have valve 224 operably associated therewith. Valve 224 can be operably configured to open or close fluid communication between receptacle 214 and void 220, for example. In accordance with example configurations, a pressure measuring device 216 can be operably associated with void 220 to measure the pressure within void 220, thereby measuring the pressure downstream from void 220 to discharge opening 218.

In accordance with example implementations, referring to FIGS. 10 and 11 for example, top view and elevational cross sectional views are respectively provided of manifold 200, showing receptacle 210 in fluid communication with void 220, and receptacle 214 in fluid communication with void 220 having valve 224 associated therewith. Cross sectional elevation of FIG. 11 also depicts discharge opening 218. As can be seen, discharge opening 218 is in continuous fluid communication with void 220 as well as receptacle 210.

In accordance with example configurations, manifold 200 can be in fluid communication with the gas supply and sealant supply assemblies described. The manifold can define at least one junction of at least two conduits in fluid communication. This junction of two conduits in fluid communication can be the junctions as defined between void 220 and conduits associated with receptacles 210, 212, 214, discharge 218, and/or conduit to pressure sensor 216, for example. The first of the two conduits can be the conduit that is in fluid communication with the gas supply assembly, and a second of the two conduits can be in fluid communication with the sealant supply, for example, as shown when valve 222 is operably open to put receptacle 212 in fluid communication with void 220. As described, at least a valve can reside within this second conduit between the one junction of the sealant supply, for example. In accordance with example implementations, the first conduit, such as the conduit extending from receptacle 210 to void 220 can extend continuously through the manifold to an exit such as discharge 218 from the manifold. In accordance with example implementations, expansive void 220 can be in fluid communication with the first and second conduits with the void also partially defining an exit conduit such as exit conduit 218.

Figure 12:
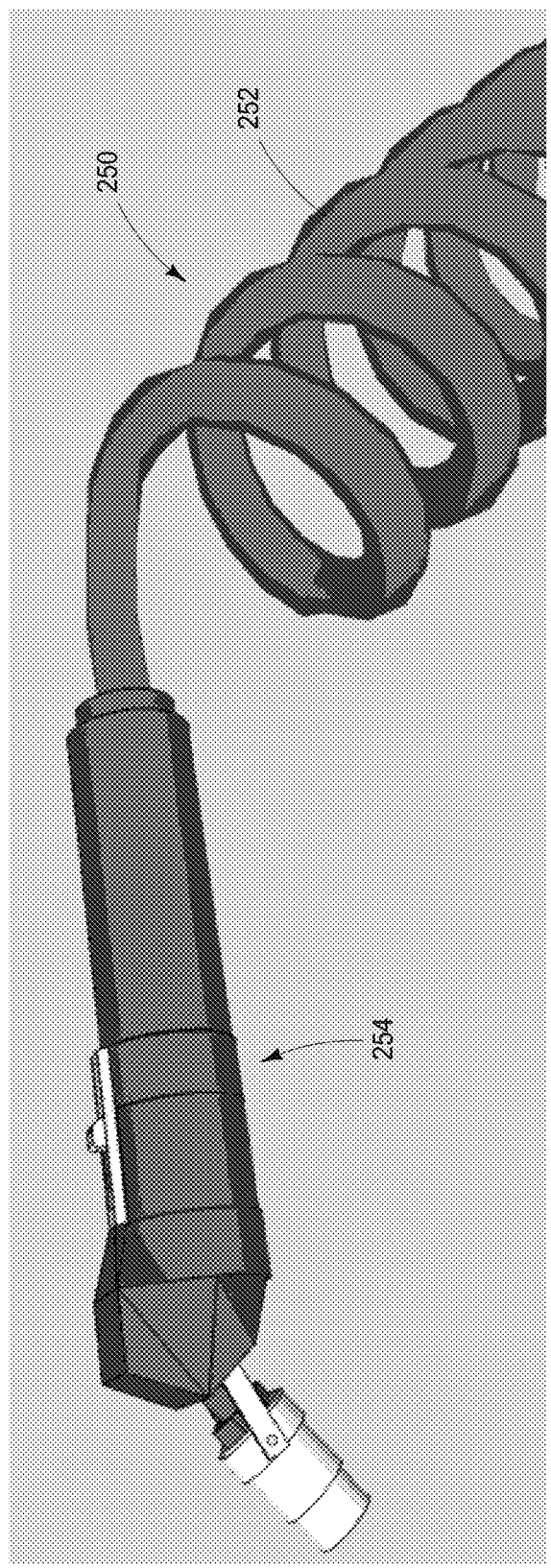
FIG. 12 is a view of a tire valve stem coupling device according to an embodiment of the disclosure.

Referring next to FIG. 12, a portion of a tire sealant vending assembly is provided as portion 250. Portion 250 can include a conduit bundle 252. Conduit bundle 252 can extend from supply assemblies, such as a gas supply assembly, a sealant supply assembly, and/or a clean out supply assembly to tire valve stem coupling device 254. Individual conduits within bundle 252 can be in fluid communication with the supply assemblies. In accordance with example configurations, one or more of the conduits within the bundle can be heated. For example at least the conduit for the sealant can be heated and/or the conduit for the clean out solution can be heated. Heating of these conduits can be accomplished with coiled wire and/or commercially available heat tape. The coils or heat tape can be coupled to a power source and/or controlled by the processing circuitry of the assemblies of the disclosure.

Figure 13:
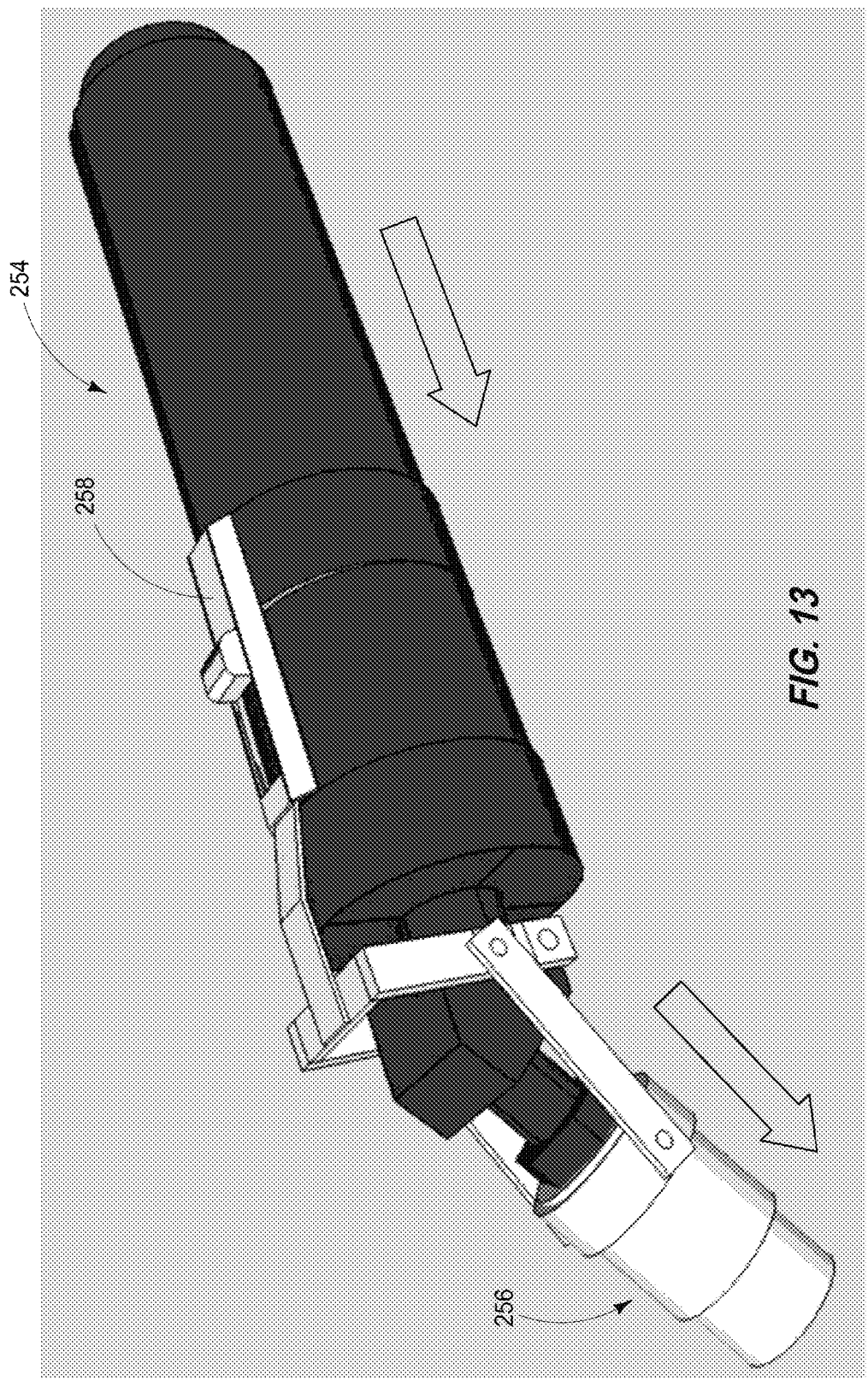
FIG. 13 is a view of a tire valve stem coupling device according to another embodiment of the disclosure in one configuration.

Referring next to FIG. 13, an example tire valve stem coupling device 254 according to an embodiment of the disclosure is depicted in one configuration. FIG. 13 depicts device 254 in a configuration prior to engaging nozzle and chuck assembly 256. Thumb slide 258 can be used in the forward direction to engage a nozzle to the chuck assembly as shown. This engagement can assist in the clean out process or method described herein.

Figure 14:
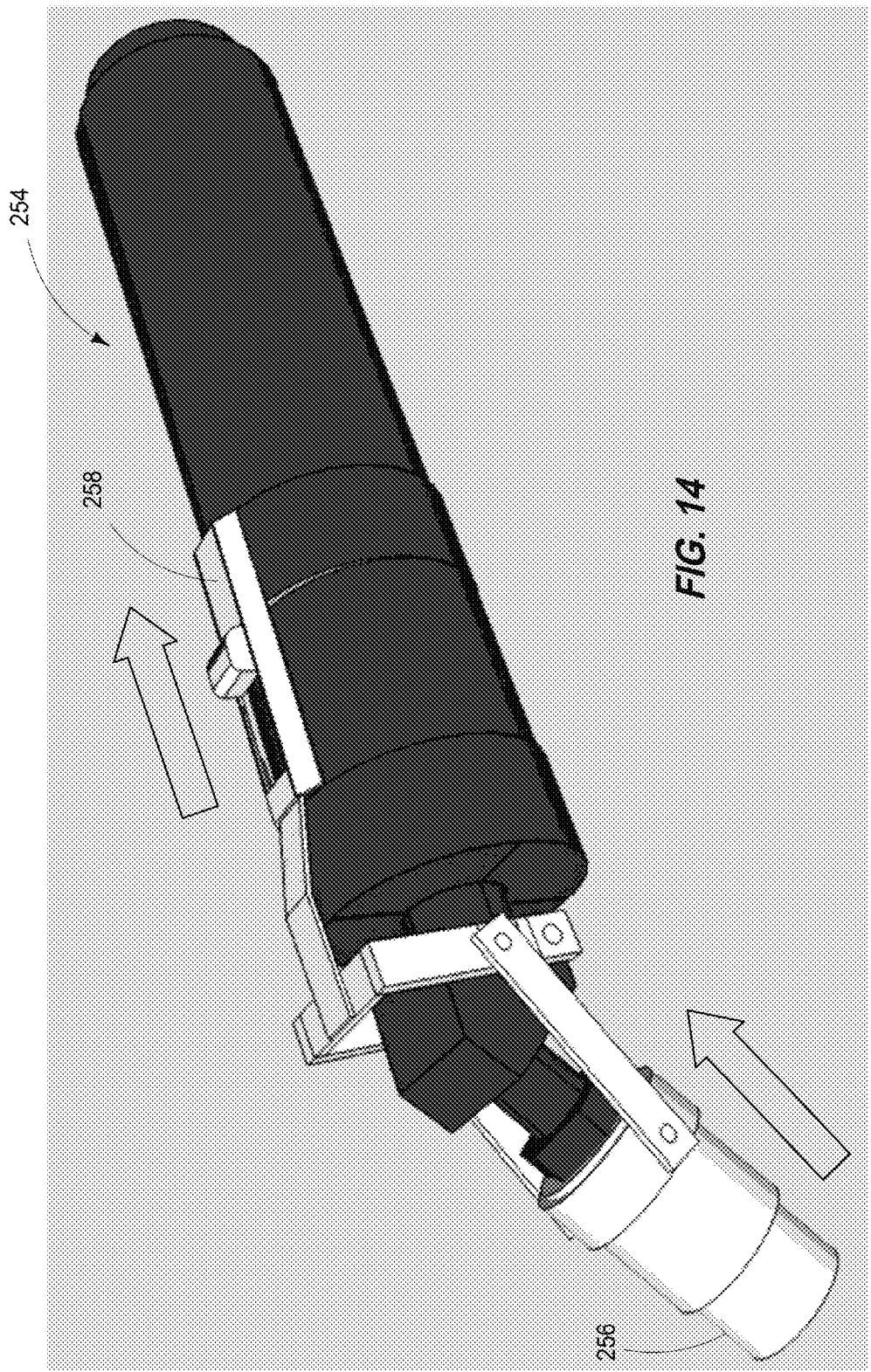
FIG. 14 is the device of FIG. 13 in another configuration.

Referring next to FIG. 14, in an alternative configuration, thumb slide 258 is returned to its previous position, thereby unlocking nozzle within nozzle and chuck assembly 256. The majority of device 254 can be shrink-wrapped, thereby covering the members extending between thumb slide 258 and nozzle and chuck assembly 256.

Figure 15:
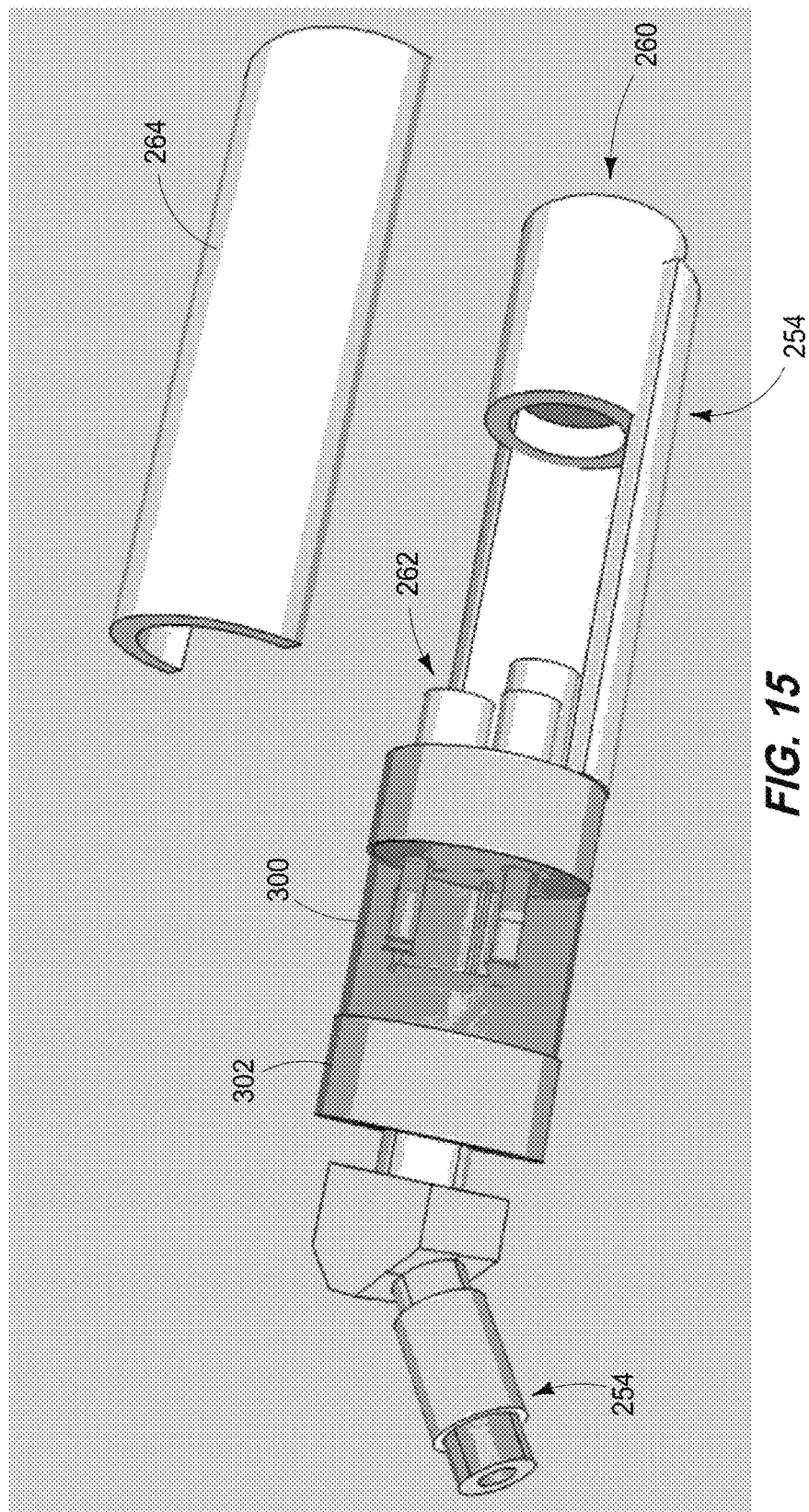
FIG. 15 is a more detailed view of a tire valve stem coupling device according to an embodiment of the disclosure.

Referring next to FIG. 15, a more detailed view of valve stem coupling device 254 is shown. Valve stem coupling device 254 can extend from one end 260 to nozzle and chuck assembly 254. At end 260 can reside a push fitting to receive coiled conduits described herein, for example, at least three conduits; one conduit for gas, one conduit for tire sealant, one conduit for clean out solution. These conduits can be respectively received by tube fittings 262, which reside under a removable cover 264. Tube fittings 262 can be respectively in communication with a manifold 300 that can be housed between the fittings and an aluminum cap 302. From aluminum cap 302 can extend nozzle chuck assembly 254, for example.

Figure 16:
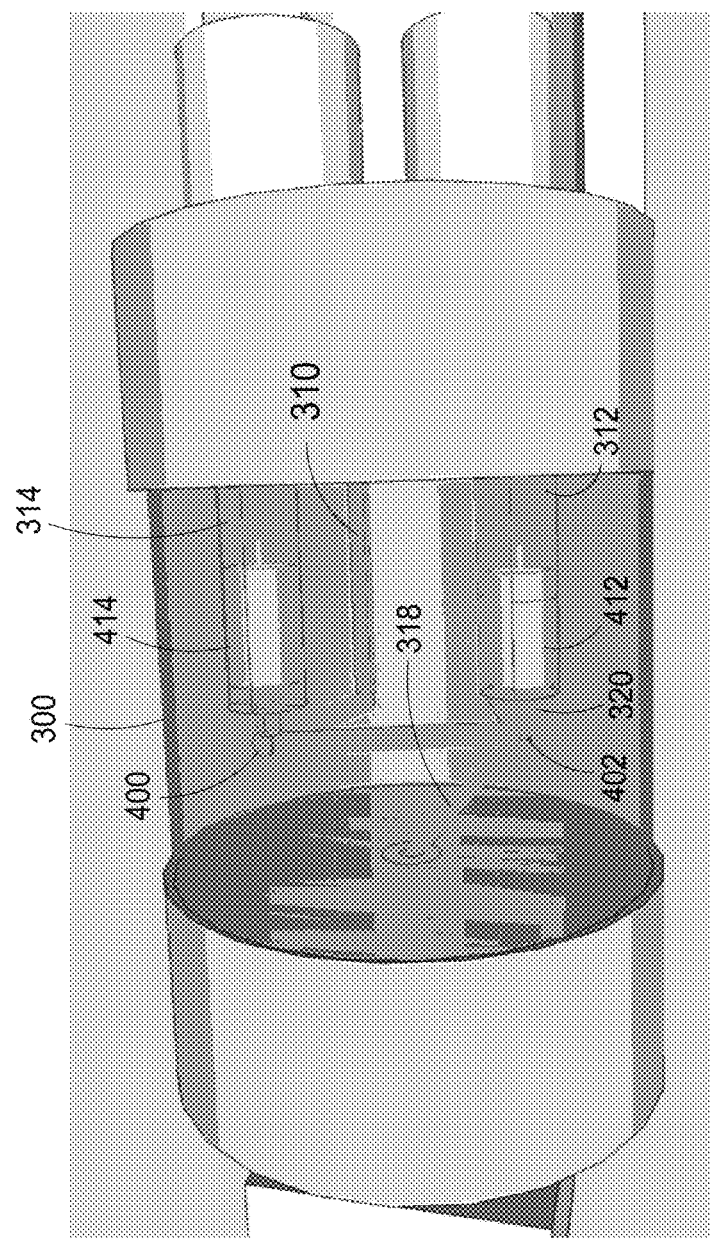
FIG. 16 is a view of a portion of the valve stem coupling device according to an embodiment of the disclosure.
Figure 19:
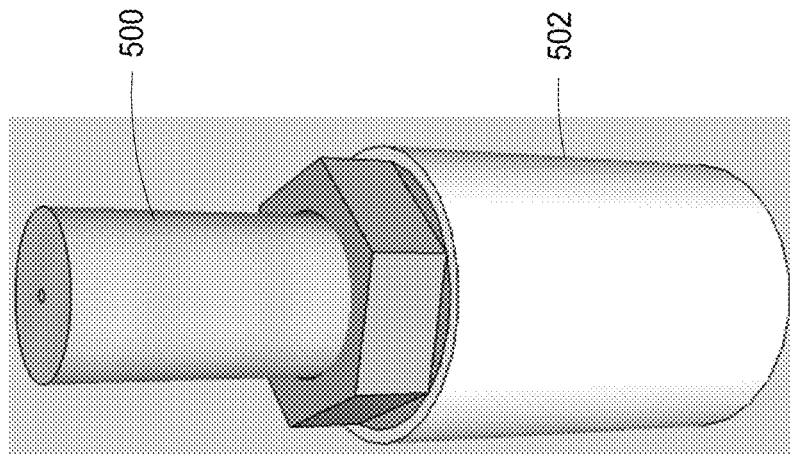
FIG. 19 is another view of a portion of the chuck and nozzle assembly of FIG. 18 according to an embodiment of the disclosure.

Referring next to FIG. 16, manifold 300 in combination with aluminum cap and tube fittings is shown in more detail. As can be seen, manifold 300 can include or define at least four conduits; gas conduit 310 in fluid communication with a gas supply assembly, for example that extends to a junction 400; another conduit 314 that extends to junction 400 and also includes a valve 414. Valve 414 in the closed position can reside against a base of conduit 314, thereby restricting flow of clean out solution to junction 400. Conduit 310 extends through junction 400 to junction 402 to engage in fluid communication tire sealant conduit 312, which includes valve 412. At junction 402, an expansion 320 is defined within manifold 300. This expansion at junction 402 extends into discharge conduit 318.

Referring again to FIG. 16, as can be seen, void 320 can define a frustum having a top base associated with junction 402 and a bottom base associated with the terminus of conduit 312. As can be seen, air intake conduit 310, after extending after extending through junction 400 can enter the sidewall of the frustum and the discharge 318 can exit the upper base of the frustum. In accordance with example implementations, as depicted, a valve resides within the cleanout solution conduit of the manifold between the junction 400 and the clean out supply assembly. Referring to FIG. 16, both junctions 400 and 402 are between the exit and entrance of the gas conduit along the gas conduit. In accordance with another implementation, junction 402 is between the exit of the gas conduit and junction 400 along the gas conduit. The individual conduits extending into the valve stem device can be configured to be heated. Example heating strategies can include heating only the fluid containing conduits. Example methods of heating the fluid conduits can include a wire wrap, wire tape, or wire resistant tape bundles that can be controlled, for example, by the main apparatus, such as temperature control components described herein.

In accordance with another embodiment of the disclosure, manifold 350 is provided in FIG. 17. As shown in FIG. 17, manifold 350 can include conduits 352, 354, and 356 extending from one end of manifold 350 to an expansion 360. Conduits 356 and 354 can be configured to receive fluid such as clean out solution and/or tire sealant. These conduits can include valves respectively that can be configured to restrict access to void 360. Conduit 352 can be configured to receive gas such as air from a gas supply assembly and direct that gas into expansion 360. From expansion 360 can be discharge conduit 358.

In accordance with example implementations, either at the device or on the main assembly that houses the supply assemblies, an actuator can be provided to configure the device to discharge gas in one configuration, and tire sealant in another configuration. In accordance with example implementations, the actuator can maintain a valve within a tire sealant conduit in a closed position, and in another configuration, the actuator can maintain a valve within a tire sealant conduit in an open position. In the one configuration, a discharging clean out solution can also be provided, and in the one configuration wherein the actuator can maintain the one valve within the tire sealant conduit in a closed position, and another valve within the clean out solution conduit in an open position.

Figure 18:
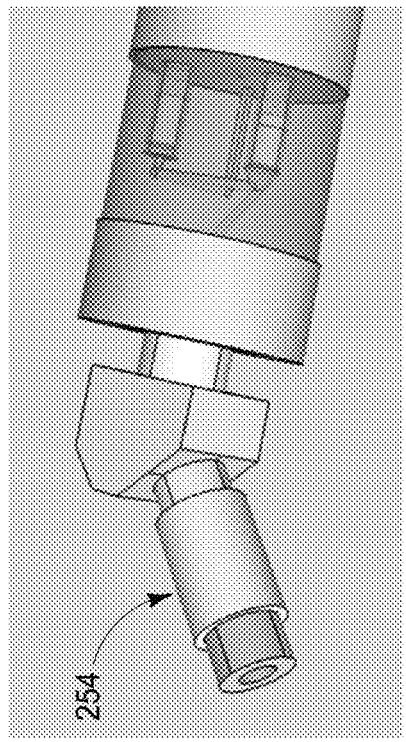
FIG. 18 is a view of a chuck and nozzle assembly of a tire valve stem coupling device according to an embodiment of the disclosure.
Figure 21:
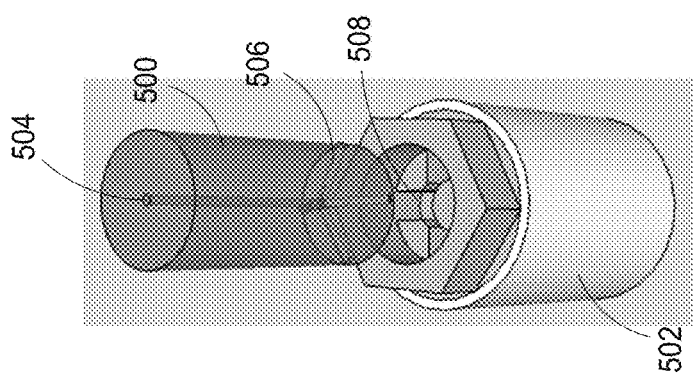
FIG. 21 is another view of the chuck and nozzle assembly of FIG. 18 according to an embodiment of the disclosure.
Figure 20:
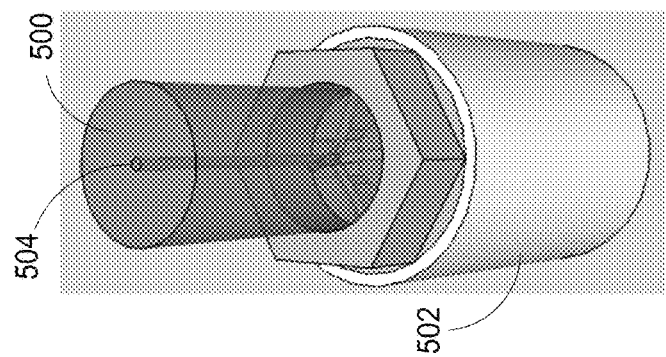
FIG. 20 is another view of the chuck and nozzle assembly of FIG. 18 according to an embodiment of the disclosure.

Referring next to FIG. 18 a more detailed view of the chuck nozzle assembly 254 is shown. In accordance with an example implementation, nozzle 500 can be coupled to chuck 502 in FIG. 19 via an aluminum threaded male coupler nozzle, for example. Referring next to FIGS. 20 and 21, nozzle 500 is seated within chuck 502, and as can be see, nozzle 500 can define the junction of a plurality of entrance conduits 506 with discharge conduit 504, for example. These entrance conduits 506 can be complimentarily aligned with recesses 508 within chuck 502.

Figure 22:
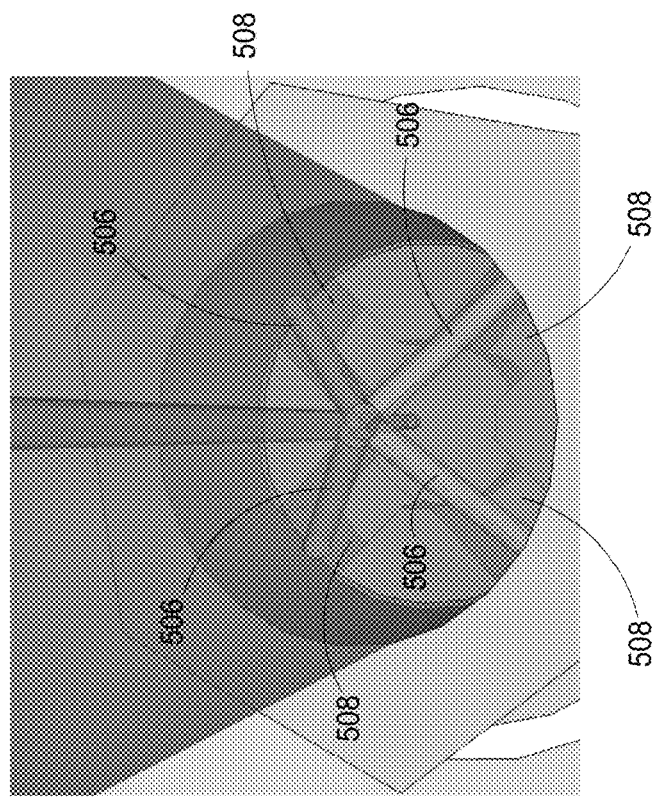
FIG. 22 is another view of the chuck and nozzle assembly of FIG. 18 according to an embodiment of the disclosure.

Referring next to FIG. 22, a more detailed view of the alignment of a plurality of entrance conduits 506 is shown. As can be seen, these conduits extend at an angle away from the junction to an end of nozzle 500, and an additional conduit 510 is shown that has a smaller opening circumference than the opening circumference of the conduits 506 upon entrance to nozzle 504. Accordingly, nozzle 500 can extend longitudinally from one end to another end, with the end defining a plurality of openings extending as a plurality of conduits into the nozzle. The other end of the nozzle can define a single opening extending as a single discharge conduit into the nozzle, and the nozzle can further define a junction of the plurality of conduits and the discharge conduit between conduit 504 and conduits 506, for example. The chuck of the chuck nozzle assembly can be configured to operably engage the one end of the nozzle in two configurations, with one of the two configurations being locking the nozzle within the chuck, and the other of the two configurations unlocking the nozzle within the chuck, the chuck defining a plurality of recesses that are complimentary to the plurality of openings of the one end of the nozzle. The one end of the opening that has the smaller opening circumference can extend linearly into the discharge conduit and continuously. The remainder of the plurality of the conduits aside from the small circumference conduit can be at least four conduits.

Figure 23:
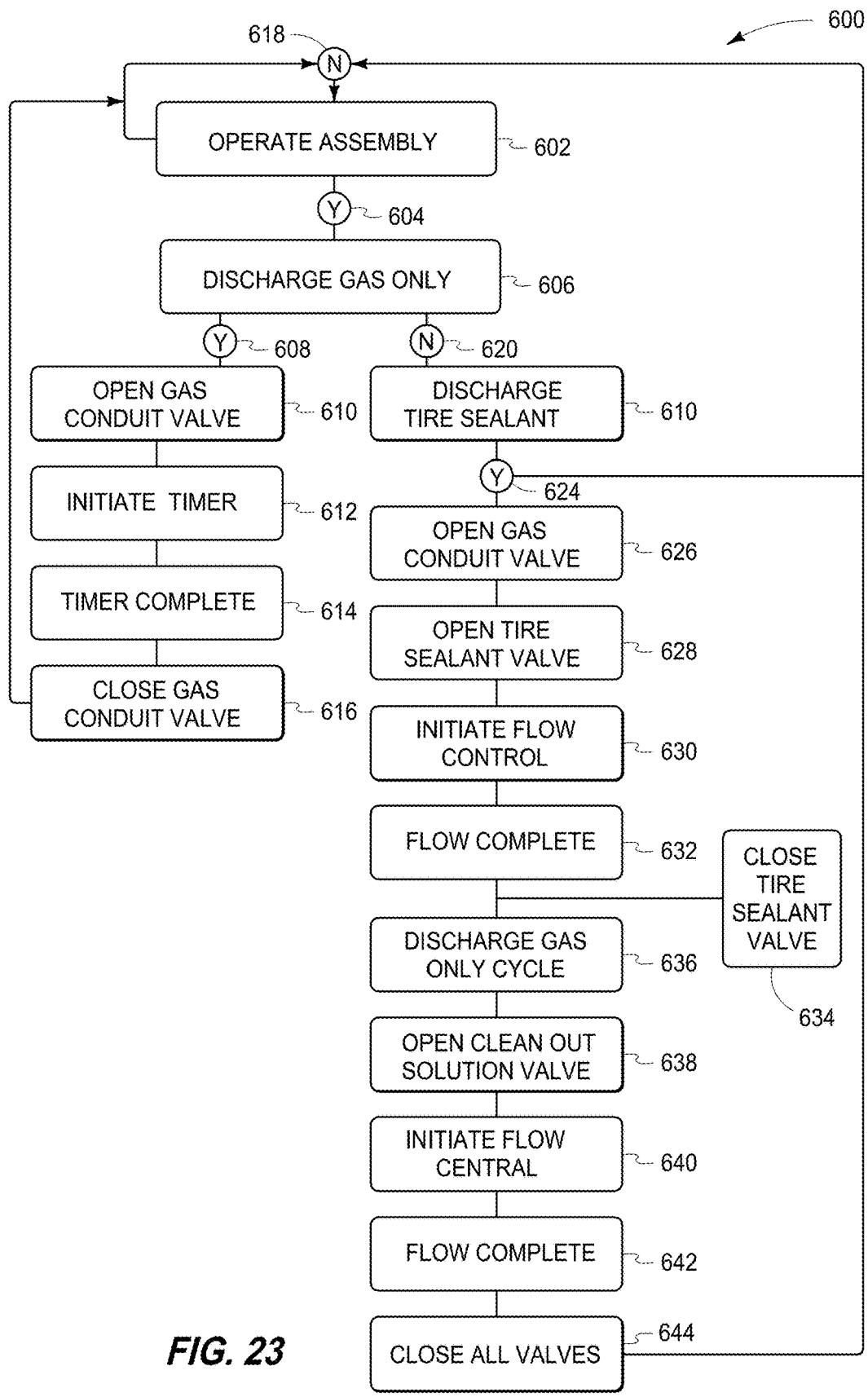
FIG. 23 is an example method according to an embodiment of the disclosure.

Referring next to FIG. 23, the context of the methods of providing gas and tire sealant to a tire will be described. Method 600 or algorithm 600 can be utilized by the computer processing circuitry of the present disclosure to perform the methods described herein. According to an example implementation, methods can include providing one or both of gas and/or tire sealant to a tire, with the method including providing a tire stem coupling device and providing sealant through the device to a valve stem of a tire and into the tire. The method can further include, without providing sealant through the device, providing gas through the device to the valve stem of the tire into the tire. Accordingly, this method can utilize the assemblies of the present disclosure, for example, by manipulating the valve control of the manifolds, either within the tire stem device or within the apparatus itself. For example, the providing the sealant through the device can include disengaging a valve in fluid communication with the sealant from a closed position to an open position. The method can also include providing gas, wherein the providing the gas through the device includes engaging a valve in fluid communication with the sealant from an open position to a closed position.

Methods for providing both of a gas and/or a tire sealant to a tire can also including providing both gas and tire sealant to a manifold operatively coupled to both a gas supply assembly and tire sealant assembly. As described, this manifold can exist either in the tire engagement device or in the assembly of the apparatus itself. The manifold can be provided with at least one valve, and the valve can be engaged to discharge only gas from the manifold to the tire. The method can also include disengaging the one valve within the manifold to discharge tire sealant from the manifold to the tire. These methods can further include providing clean out solution to the manifold, as well as gas and tire sealant, for example. The methods can include providing another valve within the manifold, and engaging the other valve to discharge only gas from the manifold to the tire and disengaging the other valve within the manifold to discharge clean out solution from the manifold. It can also provide for when the one valve is engaged, the other valve is disengaged, or when only gas is discharged from the manifold, both valves are engaged. The disclosure provides methods for providing one or both of gas and/or tire sealant to the tire with the method including providing both gas and tire sealant through a bundle of conduit to a tire valve stem coupling device and operatively configuring the device in a first configuration to provide only gas to the tire, or in a second configuration, to provide tire sealant to the tire. The methods can include operatively configuring the device in a third configuration to provide clean out solution through the device when the device is not configured in the first or second configuration, and the methods can also include operatively configuring the device from a user interface associated with a housing encompassing gas, tire sealant, and/or clean out solution supply assemblies. The methods can include utilizing a user interface that includes a currency receptacle.

In accordance with example implementations, when sealant is being delivered to a tire, an air compressor can be used to check the pressure and ensure that the air chuck is attached correctly, which can be controlled by the processing circuitry of the assembly. In accordance with example implementations, once the pressure reading is acceptable, a sealant pump can start for a specific amount of time, depending upon the size of the tire a consumer selects. The clean out liquid pump can make small injections while the air compressor is engaged. The air compressor can clean out sealant left in the air chuck handle, and then can be used to provide air to the tire. As an example, algorithm or flow chat 600 is provided that begins with an operate assembly step 602. At the user interface, for example, a consumer can be asked to operate the assembly at step 602. Decision point 604 renders yes, then they proceed to discharge gas only step request 606. If not, the loop returns to 618, and no. At discharge gas only request, if request is yes at step 608, the open gas conduit valve at 610 is opened, and a timer for example of gas providing at step 612 is initiated. Also a pressure regulation step can be incorporated here as desired. At step 614, the timer is complete, or the pressure regulation step is complete, and at step 616, the gas conduit valve is closed, returning to step 618. If discharge gas only is denied at step 620, at step 622, a discharge tire sealant request is made, and if the answer is yes, the process can continue to step 626 to open the gas conduit valve, and then on to step 628 to open the tire sealant valve. At step 630, flow control of tire sealant and/or weight control as desired can be provided. At step 632, flow control is determined complete, or weight control is determined complete, and at step 634, tire sealant valve can be closed. At step 636, discharge gas only cycle can be initiated, and at step 638, the clean out valve can be opened and initiate step 640, flow control of the clean out solution can be monitored. At step 642 the flow can reach a threshold point and be complete, and at step 644, all valves can be closed and return to step 618. As an example, the discharge gas only cycle can include, for example, steps 610, 612, and 614.

The invention claimed is:

1. A tire sealant vending assembly configured to provide tire sealant via the valve stem of a tire, the assembly comprising:
    a gas supply assembly;
    a sealant supply assembly;
    a manifold in fluid communication with the gas supply and sealant supply assemblies, the manifold defining at least one junction of at least two conduits in fluid communication, a first of the two conduits in fluid communication with the gas supply assembly and a second of the two conduits in fluid communication with the sealant supply, wherein a valve resides within the second conduit of the manifold between the one junction and the sealant supply, and wherein the one junction defines an expansive void in fluid communication with the first and second conduits, the void defining an exit conduit; and
    a tire valve stem coupling device in fluid communication with the manifold.

2. The assembly of claim 1 wherein the manifold defines another junction between the first conduit and a third conduit in fluid communication with a clean out supply assembly, wherein a valve resides within the third conduit of the manifold between the other junction and the clean out supply assembly.

3. The assembly of claim 1 wherein the expansive void defines a frustum having an upper base and a lower base, the first conduit entering a wall of the frustum and the exit conduit exiting the upper base.

* * * * *